(12) United States Patent
Baxter et al.

(10) Patent No.: US 10,563,916 B2
(45) Date of Patent: Feb. 18, 2020

(54) HAIL TOWER FOR GAS-VAPOR SEPARATIONS

(71) Applicants: Larry Baxter, Orem, UT (US); Aaron Sayre, Spanish Fork, UT (US); Christopher Hoeger, Provo, UT (US); Stephanie Burt, Provo, UT (US); David Frankman, Provo, UT (US); Eric Mansfield, Spanish Fork, UT (US); Nathan Davis, Bountiful, UT (US)

(72) Inventors: Larry Baxter, Orem, UT (US); Aaron Sayre, Spanish Fork, UT (US); Christopher Hoeger, Provo, UT (US); Stephanie Burt, Provo, UT (US); David Frankman, Provo, UT (US); Eric Mansfield, Spanish Fork, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 422 days.

(21) Appl. No.: 15/635,985

(22) Filed: Jun. 28, 2017

(65) Prior Publication Data
US 2019/0003767 A1   Jan. 3, 2019

(51) Int. Cl.
*B01D 53/00* (2006.01)
*F25J 3/06* (2006.01)
*F25J 3/08* (2006.01)
*B02C 23/10* (2006.01)
*F25J 1/00* (2006.01)

(52) U.S. Cl.
CPC .............. *F25J 3/067* (2013.01); *B01D 53/00* (2013.01); *B01D 53/002* (2013.01); *B02C 23/10* (2013.01); *F25J 1/0027* (2013.01); *F25J 3/06* (2013.01); *F25J 3/08* (2013.01); *B01D 2257/302* (2013.01); *B01D 2257/304* (2013.01); *B01D 2257/404* (2013.01); *B01D 2257/408* (2013.01); *B01D 2257/504* (2013.01); *B01D 2257/602* (2013.01)

(58) Field of Classification Search
CPC ................. B01D 53/00; F25J 3/06; F25J 3/08
See application file for complete search history.

(56) References Cited

U.S. PATENT DOCUMENTS

| 5,307,638 A * | 5/1994 | Herzog | B01D 5/0024 |
| | | | 165/104.15 |
| 8,715,401 B2 * | 5/2014 | Baxter | B01D 7/02 |
| | | | 96/150 |

\* cited by examiner

*Primary Examiner* — Robert A Hopkins

(57) ABSTRACT

A device and process for removing vapors from a gas is disclosed. A tower is provided. Sub-cooled pellets are distributed by the solids distributor across a horizontal cross-section of the tower. A process gas, comprising a product vapor, passes through the gas inlet. The product vapor and the sub-cooled pellets comprise the same material. The product vapor and the sub-cooled pellets agglomerate as the product vapor desublimates onto the sub-cooled pellets, forming product pellets and a vapor-depleted gas. A crushing device, a screening device, and a solids heat exchanger are provided. A portion of the product pellets are recycled as sub-cooled pellets to the solids distributor by crushing and screening the portion of the product pellets to the size distribution of the sub-cooled pellets and cooling the portion of the product pellets to produce the sub-cooled pellets.

20 Claims, 5 Drawing Sheets

500

501
Provide a tower, comprising a solids distributor, a gas outlet, a solids outlet, and a gas inlet

502
Pass sub-cooled pellets through the solids distributor into the tower

503
Pass a process gas, comprising a vapor, through the gas inlet

504
Agglomerate the product vapor with the sub-cooled pellets by desublimation, forming product pellets and a vapor-depleted gas

505
Pass the product pellets out the solids outlet and the vapor-depleted gas out the gas outlet

506
Crush, screen, and cool a portion of the product pellets to produce the sub-cooled pellets

FIG. 5

HAIL TOWER FOR GAS-VAPOR SEPARATIONS

This invention was made with government support under DE-FE0028697 awarded by The Department of Energy. The government has certain rights in the invention.

FIELD OF THE INVENTION

This invention relates generally to gas/vapor separation. More particularly, we are interested in removal of vapors, such as carbon dioxide, from gases, such as flue gas, using desublimation.

BACKGROUND

The need to separate vapors from gases is common to many industries, and is often among the most difficult separation processes. A common technique is absorption, wherein the vapor is absorbed by a liquid, resulting in the vapor being dissolved, condensed, or desublimated into the liquid. While this does result in gas/vapor separation, it adds an extra separation step, as the vapor now has to be removed from the liquid.

Another technique is to condense or desublimate the vapor onto a solid substrate in a fluidized bed or lift pipe. Fluidized beds and lift pipes are complicated and prone to operational issues.

Shot towers operate by the principle of dropping metal pellets down a tower while spraying the pellets with a molten liquid, the molten liquid building up the pellet to a larger size. While these are useful, they are not designed for vapor removal from a gas.

A process and device for desublimating a vapor out of a gas without these deficiencies is needed.

Brigham Young University Scholars Archive publication, "Cryogenic Carbon Capture using a Desublimating Spray Tower," a thesis by Nielson, published under supervision of the Applicant, teaches cryogenic carbon capture utilizing a shot tower. The present disclosure differs from this prior art disclosure in that the prior art disclosure utilizes metal shot, cooled to cryogenic temperatures, to capture carbon dioxide by desublimation, not sub-cooled pellets of the same material as the vapor. Further, the prior art disclosure has no crushing or screening of the pellets, as the pellets are not of the same material as the vapor, and so recycle in this manner would not be effective. This prior art disclosure is pertinent and may benefit from the devices and methods disclosed herein and is hereby incorporated for reference in its entirety for all that it teaches.

U.S. Pat. No. 2,287,029, to Dowdell, teaches a method for making shot. The present disclosure differs from this prior art disclosure in that the prior art disclosure involves producing shot or powder from a liquid spray, not by desublimation of a vapor. This prior art disclosure is pertinent and may benefit from the devices and methods disclosed herein and is hereby incorporated for reference in its entirety for all that it teaches.

SUMMARY

A device and process for removing vapors from a gas is disclosed. A tower is provided comprising a solids distributor and a gas outlet in a top portion of the tower and a solids outlet and a gas inlet in a bottom portion of the tower. Sub-cooled pellets pass through the solids distributor, the solids distributor distributing the sub-cooled pellets across a horizontal cross-section of the tower. The sub-cooled pellets comprise a size distribution. A process gas, comprising a product vapor, passes through the gas inlet. The product vapor and the sub-cooled pellets comprise the same material. The product vapor and the sub-cooled pellets agglomerate as the product vapor desublimates onto the sub-cooled pellets, forming product pellets and a vapor-depleted gas. The product pellets pass out of the solids outlet and the vapor-depleted gas out of the gas outlet. A crushing device, a screening device, and a solids heat exchanger are provided. A portion of the product pellets are recycled as sub-cooled pellets to the solids distributor by crushing and screening the portion of the product pellets in the crushing device and screening device, respectively, to the size distribution of the sub-cooled pellets and cooling the portion of the product pellets in a solids heat exchanger to produce the sub-cooled pellets.

The process gas may comprise flue gas, syngas, producer gas, natural gas, steam reforming gas, hydrocarbons, light gases, refinery off-gases, organic solvents, steam, ammonia, or combinations thereof. The vapor may comprise carbon dioxide, nitrogen oxide, sulfur dioxide, nitrogen dioxide, sulfur trioxide, hydrogen sulfide, hydrogen cyanide, water, mercury, hydrocarbons, or combinations thereof.

The solids distributor may comprise a screen, a vibrating screen, a plurality of solid inlets situated evenly around a circumference of the top portion of the tower, or a combination thereof. An auger may pass the sub-cooled pellets to the solids distributor.

A plurality of towers may be provided in series, each of the plurality of towers connected by augers that convey solids.

A lock hopper after the solids outlet and a lock hopper before the solids distributor may be provided to maintain pressure in the tower while passing solids into and out of the tower.

The solids heat exchanger may comprise a plate-type solid heat exchanger, a horizontal bulk solid heat exchanger, a fluidized-bed heat exchanger, or combinations thereof.

The crushing device may comprise a crusher, grinder, other comminution device, or combinations thereof. The screening device may comprise a tumbler screen, a circle-throw vibrating screen, a high-frequency vibrating screen, a gyratory screen, a trommel screen, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 shows a process for separating a vapor from a gas.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

The term agglomeration is generally used to refer to collecting or forming solids into a mass. The denotation is broader than this, and the term is used herein in the broader sense. As such, agglomeration of a solid and a vapor means the solid and vapor collect or form into a mass.

Figure 1:
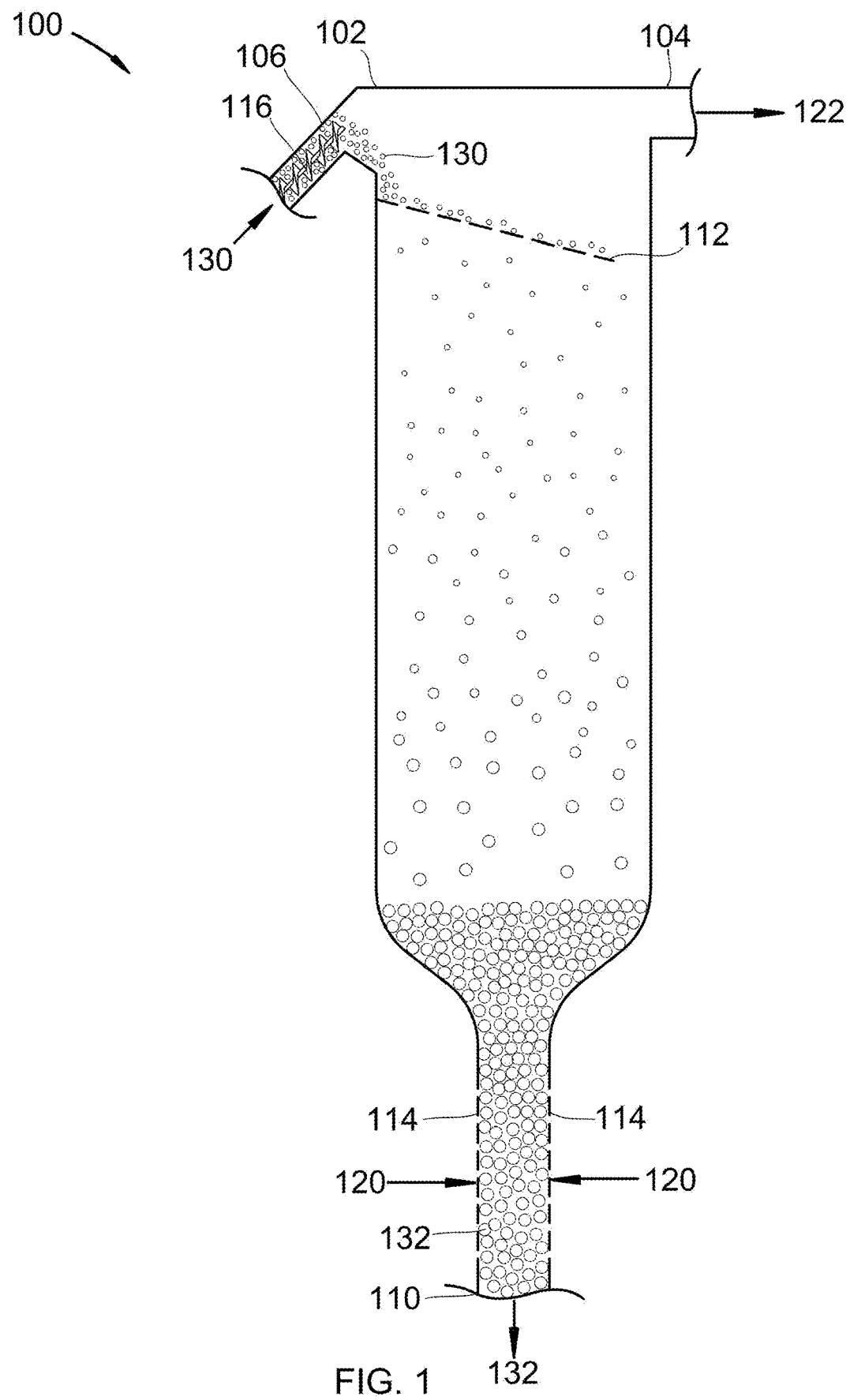
FIG. 1 shows a hail tower for separating a vapor from a gas.

Referring to FIG. 1, a hail tower for separating a vapor from a gas is shown at 100, as per one embodiment of the present invention. Hail tower 102 comprises gas outlet 104, solids inlet 106, solids outlet 110, solids distribution screen 112, gas inlet 114, and auger 116. Sub-cooled pellets 130 enter tower 102 through solids inlet 106 and are distributed across a horizontal cross-section of tower 102 by screen 112. Sub-cooled pellets 130 comprise a first size distribution. Process gas 120 passes through gas inlet 114 and ascends tower 102. Process gas 120 comprises a product vapor. Sub-cooled pellets 130 agglomerate with the product vapor as the product vapor desublimates onto sub-cooled pellets 130, producing product pellets 132 and vapor-depleted gas 122. Product pellets 132 pass through solids outlet 110. Vapor-depleted gas 122 passes out of gas outlet 104. A portion of product pellets 132, which comprise a second size distribution which is larger than the first size distribution, pass through a crushing device and a screening device to reach the first size distribution. This crushed and sized material is then cooled in a solids heat exchanger to produce sub-cooled pellets 130.

Figure 2:
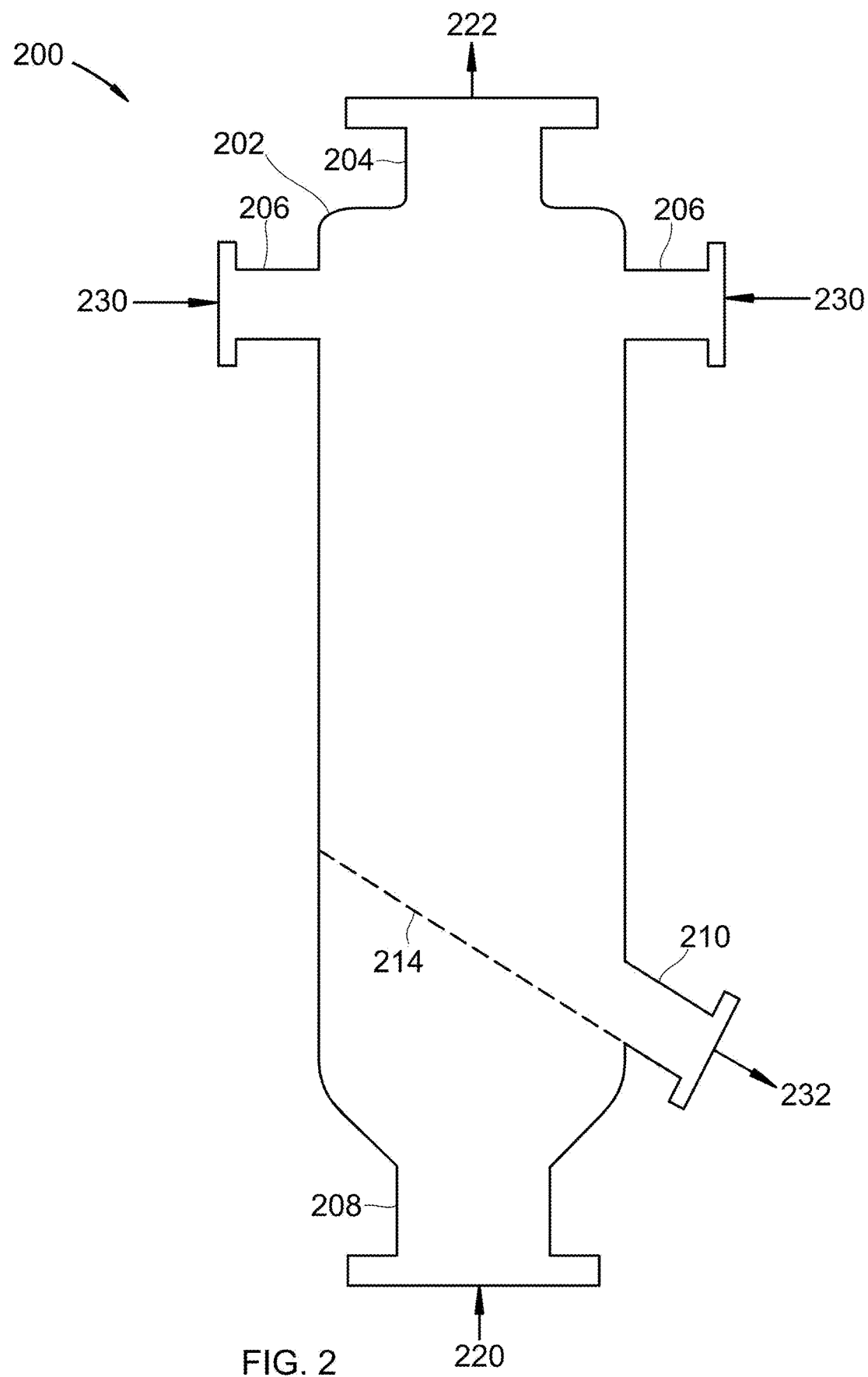
FIG. 2 shows a hail tower for separating a vapor from a gas.

Referring to FIG. 2, a hail tower for separating a vapor from a gas is shown at 200, as per one embodiment of the present invention. Hail tower 202 comprises gas outlet 204, solids inlets 206, solids outlet 210, lower gas inlet 208, and upper gas inlet 214. Sub-cooled pellets 230 enter tower 202 through solids inlets 206 and are distributed across a horizontal cross-section of tower 202. Solids inlets 206 consist of inlets distributed evenly around a circumference of the top portion of tower 202. Sub-cooled pellets 230 comprise a first size distribution. Process gas 220 passes through lower gas inlet 208 and upper gas inlet 214 and ascends tower 202. Process gas 220 comprises a product vapor. Sub-cooled pellets 230 agglomerate with the product vapor as the product vapor desublimates onto sub-cooled pellets 230, producing product pellets 232 and vapor-depleted gas 222. Product pellets 232 pass through solids outlet 210. Vapor-depleted gas 222 passes out of gas outlet 204. A portion of product pellets 232, which comprise a second size distribution which is larger than the first size distribution, pass through a crushing device and a screening device to reach the first size distribution. This crushed and sized material is then cooled in a solids heat exchanger to produce sub-cooled pellets 230.

Figure 3:
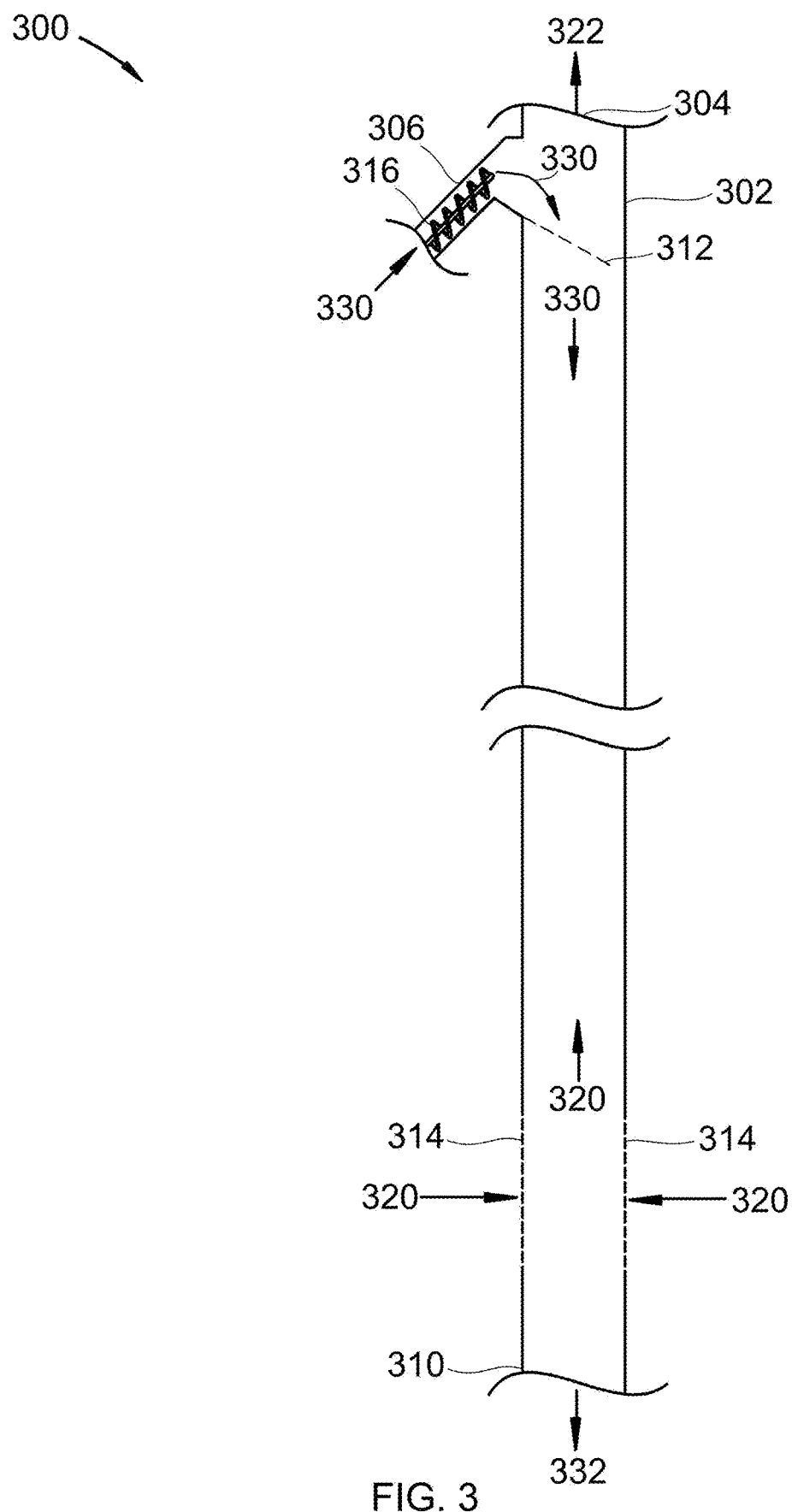
FIG. 3 shows a hail tower for separating a vapor from a gas.

Referring to FIG. 3, a hail tower for separating a vapor from a gas is shown at 300, as per one embodiment of the present invention. Hail tower 302 comprises gas outlet 304, solids inlet 306, solids outlet 310, solids distribution screen 312, gas inlet 314, and auger 316. Sub-cooled pellets 330 enter tower 302 through solids inlet 306 and are distributed across a horizontal cross-section of tower 302 by screen 312. Sub-cooled pellets 330 comprise a first size distribution. Process gas 320 passes through gas inlet 314 and ascends tower 302. Process gas 320 comprises a product vapor. Sub-cooled pellets 330 agglomerate with the product vapor as the product vapor desublimates onto sub-cooled pellets 330, producing product pellets 332 and vapor-depleted gas 322. Product pellets 332 pass through solids outlet 310. Vapor-depleted gas 322 passes out of gas outlet 304. A portion of product pellets 332, which comprise a second size distribution which is larger than the first size distribution, pass through a crushing device and a screening device to reach the first size distribution. This crushed and sized material is then cooled in a solids heat exchanger to produce sub-cooled pellets 330.

Figure 4:
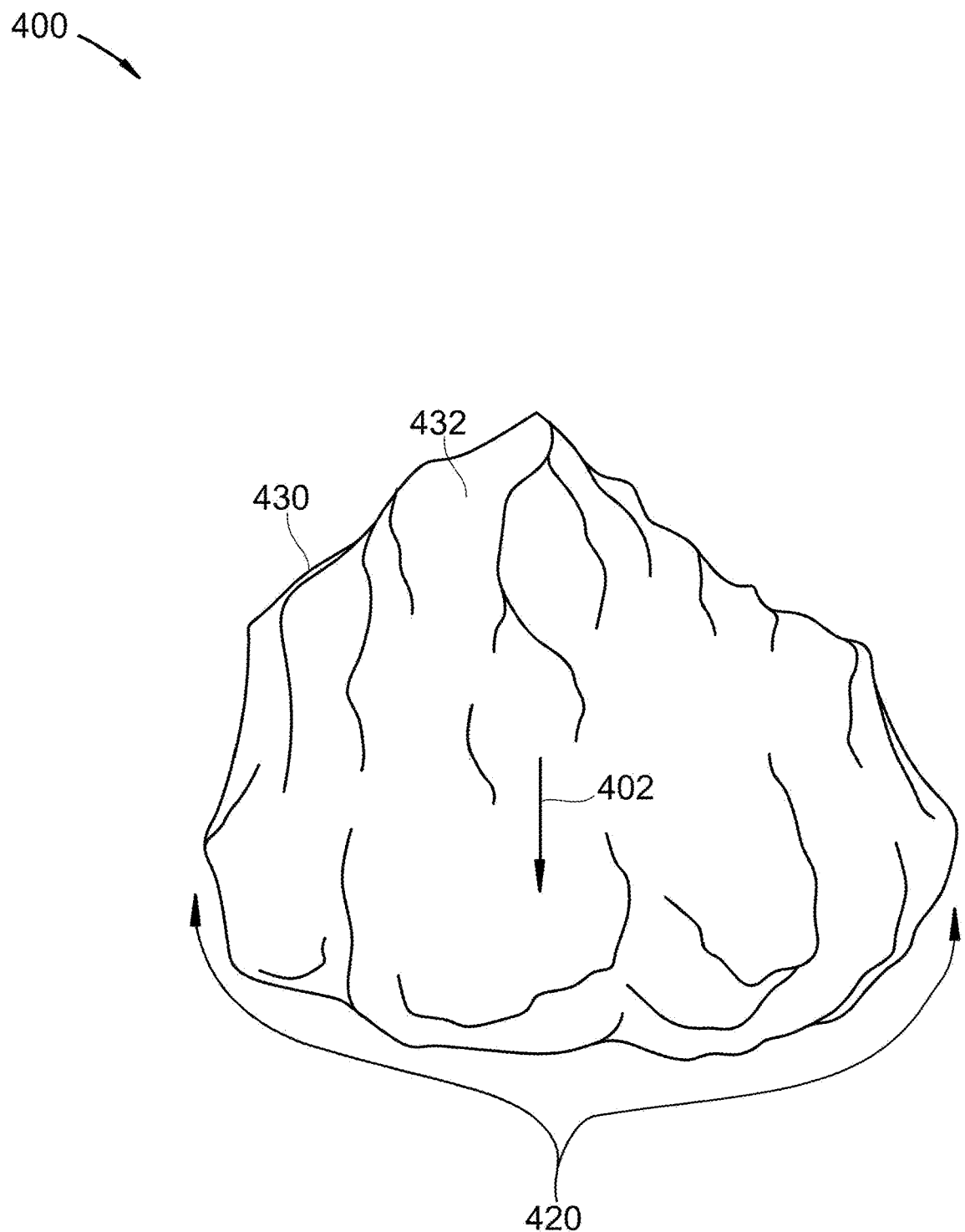
FIG. 4 shows a sub-cooled pellet of solid carbon dioxide agglomerating with a carbon dioxide vapor by desublimation.

Referring to FIG. 4, a sub-cooled pellet of solid carbon dioxide agglomerating with a carbon dioxide vapor by desublimation is shown at 400, as per one embodiment of the present invention. Pellet 430, comprising solid carbon dioxide, is cooled below the desublimation temperature of carbon dioxide vapor. As gas 420 passes across pellet 430, descending 402 through the tower, the carbon dioxide vapor contacts surface 432 of pellet 430. Due to the temperature of surface 432, the carbon dioxide vapor desublimates onto pellet 430, thereby agglomerating pellet 430 and the carbon dioxide vapor. In some embodiments, carbon dioxide is replaced with nitrogen oxide, sulfur dioxide, nitrogen dioxide, sulfur trioxide, hydrogen sulfide, hydrogen cyanide, water, mercury, hydrocarbons, or combinations thereof, including combinations with carbon dioxide.

Referring to FIG. 5, a process for separating a vapor from a gas is shown at 500, as per one embodiment of the present invention. A tower is provided comprising a solids distributor and a gas outlet in top portion and a solids outlet and a gas inlet in a bottom portion 501. Sub-cooled pellets are passed through the solids distributor and distributed across a horizontal cross-section of the tower 502. Sub-cooled pellets comprise a size distribution. A process gas, comprising a vapor, is passed through the gas inlet 503. The vapor and the sub-cooled pellets comprise the same material. The product vapor agglomerates with the sub-cooled pellets by desublimation, forming product pellets and a vapor-depleted gas 504. The product pellets pass out of the solids outlet and the vapor-depleted gas passes out of the gas outlet 505. A portion of the product pellets are crushed and screened to the size distribution 506 and cooled to produce the sub-cooled pellets 507.

In some embodiments, the process gas comprises flue gas, syngas, producer gas, natural gas, steam reforming gas, hydrocarbons, light gases, refinery off-gases, organic solvents, steam, ammonia, or combinations thereof. In some embodiments, the vapor comprises carbon dioxide, nitrogen oxide, sulfur dioxide, nitrogen dioxide, sulfur trioxide, hydrogen sulfide, hydrogen cyanide, water, mercury, hydrocarbons, or combinations thereof.

In some embodiments, the solids distributor comprises a screen, a vibrating screen, a plurality of solid inlets situated evenly around a circumference of the top portion of the tower, or a combination thereof. In some embodiments, an auger is provided that passes the sub-cooled pellets to the solids distributor.

In some embodiments, a plurality of towers are provided in series, each of the plurality of towers connected by augers that convey solids.

In some embodiments, a lock hopper is provided after the solids outlet and a lock hopper before the solids distributor to maintain pressure in the tower while passing solids into and out of the tower.

In some embodiments, the solids heat exchanger comprises a plate-type solid heat exchanger, a horizontal bulk solid heat exchanger, a fluidized-bed heat exchanger, or combinations thereof.

In some embodiments, the crushing step is accomplished by a crusher, grinder, other comminution device, or combinations thereof. In some embodiments, the screening step is accomplished by a tumbler screen, a circle-throw vibrating screen, a high-frequency vibrating screen, a gyratory screen, a trommel screen, or combinations thereof.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

The invention claimed is:

1. A process for removing vapors from a gas comprising:
providing a tower comprising a solids distributor and a gas outlet in a top portion of the tower and a solids outlet and a gas inlet in a bottom portion of the tower;
passing sub-cooled pellets through the solids distributor, the solids distributor distributing the sub-cooled pellets across a horizontal cross-section of the tower, the sub-cooled pellets comprising a size distribution;
passing a process gas through the gas inlet, the process gas comprising a product vapor, the product vapor and the sub-cooled pellets comprising the same material;
agglomerating the product vapor and the sub-cooled pellets as the product vapor desublimates onto the sub-cooled pellets, forming product pellets and a vapor-depleted gas;
passing the product pellets out of the solids outlet and the vapor-depleted gas out of the gas outlet;
recycling a portion of the product pellets as sub-cooled pellets to the solids distributor by a process comprising:
crushing and screening the portion of the product pellets to the size distribution of the sub-cooled pellets; and,
cooling the portion of the product pellets in a solids heat exchanger to produce the sub-cooled pellets.

2. The process of claim 1, wherein the process gas comprises flue gas, syngas, producer gas, natural gas, steam reforming gas, hydrocarbons, light gases, refinery off-gases, organic solvents, steam, ammonia, or combinations thereof.

3. The process of claim 2, wherein the vapor comprises carbon dioxide, nitrogen oxide, sulfur dioxide, nitrogen dioxide, sulfur trioxide, hydrogen sulfide, hydrogen cyanide, water, mercury, hydrocarbons, or combinations thereof.

4. The process of claim 3, wherein the solids distributor comprises a screen, a vibrating screen, a plurality of solid inlets situated evenly around a circumference of the top portion of the tower, or a combination thereof.

5. The process of claim 3, further comprising providing an auger that passes the sub-cooled pellets to the solids distributor.

6. The process of claim 5, further comprising providing a plurality of towers in series, each of the plurality of towers connected by augers that convey solids.

7. The process of claim 3, further comprising providing a lock hopper after the solids outlet and a lock hopper before the solids distributor to maintain pressure in the tower while passing solids into and out of the tower.

8. The process of claim 3, wherein the solids heat exchanger comprises a plate-type solid heat exchanger, a horizontal bulk solid heat exchanger, a fluidized-bed heat exchanger, or combinations thereof.

9. The process of claim 3, wherein the crushing step is accomplished by a crusher, grinder, other comminution device, or combinations thereof.

10. The process of claim 9, wherein the screening step is accomplished by a tumbler screen, a circle-throw vibrating screen, a high-frequency vibrating screen, a gyratory screen, a trommel screen, or combinations thereof.

11. A device for removing vapors from a gas comprising:
a tower comprising a solids distributor and a gas outlet in a top portion of the tower and a solids outlet and a gas inlet in a bottom portion of the tower, wherein:
sub-cooled pellets pass through the solids distributor, the solids distributor distributing the sub-cooled pellets across a horizontal cross-section of the tower, the sub-cooled pellets comprising a size distribution;
a process gas passes through the gas inlet, the process gas comprising a product vapor, the product vapor and the sub-cooled pellets comprising the same material;
the product vapor and the sub-cooled pellets agglomerate as the product vapor desublimates onto the sub-cooled pellets, forming product pellets and a vapor-depleted gas;
the product pellets pass out of the solids outlet and the vapor-depleted gas passes out of the gas outlet; and,
a crushing device, a screening device, and a solids heat exchanger, wherein a portion of the product pellets are recycled as sub-cooled pellets to the solids distributor by crushing and screening the portion of the product pellets in the crushing device and screening device, respectively, to the size distribution of the sub-cooled pellets and cooling the portion of the product pellets in a solids heat exchanger to produce the sub-cooled pellets.

12. The device of claim 11, wherein the process gas comprises flue gas, syngas, producer gas, natural gas, steam reforming gas, hydrocarbons, light gases, refinery off-gases, organic solvents, steam, ammonia, or combinations thereof.

13. The device of claim 12, wherein the vapor comprises carbon dioxide, nitrogen oxide, sulfur dioxide, nitrogen dioxide, sulfur trioxide, hydrogen sulfide, hydrogen cyanide, water, mercury, hydrocarbons, or combinations thereof.

14. The device of claim 11, wherein the solids distributor comprises a screen, a vibrating screen, a plurality of solid inlets situated evenly around a circumference of the top portion of the tower, or a combination thereof.

15. The device of claim 11, further comprising providing an auger that passes the sub-cooled pellets to the solids distributor.

16. The device of claim 15, further comprising a plurality of towers in series, each of the plurality of towers connected by augers that convey solids.

17. The device of claim 11, further comprising providing a lock hopper after the solids outlet and a lock hopper before the solids distributor to maintain pressure in the tower while passing solids into and out of the tower.

18. The device of claim 11, wherein the solids heat exchanger comprises a plate-type solid heat exchanger, a horizontal bulk solid heat exchanger, a fluidized-bed heat exchanger, or combinations thereof.

19. The device of claim 11, wherein the crushing device comprises a crusher, grinder, other comminution device, or combinations thereof.

20. The device of claim 19, wherein the screening device comprises a tumbler screen, a circle-throw vibrating screen, a high-frequency vibrating screen, a gyratory screen, a trommel screen, or combinations thereof.

* * * * *